L. ZIEGLER.
MECHANICAL MOVEMENT.
APPLICATION FILED AUG. 18, 1917.
1,252,070.
Patented Jan. 1, 1918.
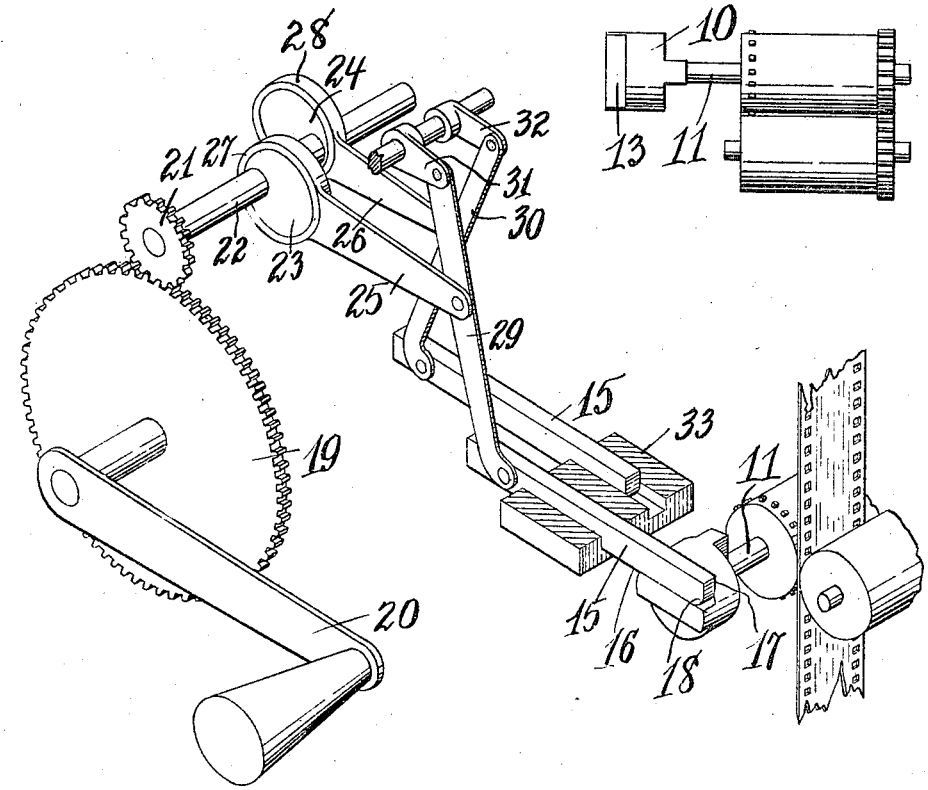
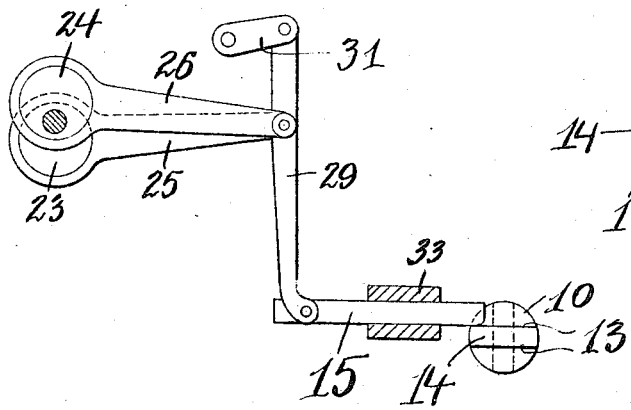
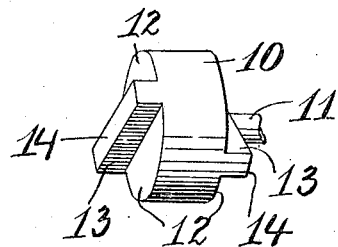
INVENTOR
Louis Ziegler
Dyke & Canfield
ATTORNEYS

UNITED STATES PATENT OFFICE.

LOUIS ZIEGLER, OF LYNDHURST, NEW JERSEY.

MECHANICAL MOVEMENT.

1,252,070.  Specification of Letters Patent.  Patented Jan. 1, 1918.

Application filed August 18, 1917. Serial No. 186,864.

*To all whom it may concern:*

Be it known that I, LOUIS ZIEGLER, a citizen of the United States, and a resident of Lyndhurst, county of Bergen, and State of New Jersey, have invented certain new and useful Improvements in Mechanical Movements, of which the following is a specification.

My invention relates to mechanical movements, and more particularly to means for producing intermittent rotation.

A mechanical movement embodying the present invention may be made use of for any purpose where a part or a machine element is to be rotated intermittently, as, for example, it may be made use of for securing the intermittent rotation of the feeding sprocket or roll of a motion picture device such as a camera or projecting machine, and an embodiment thereof is illustrated in connection with such use in the drawing forming a part hereof. In said drawing, Figure 1 is a perspective view partly in section of one form of means embodying my invention and illustrated in connection with the film of a moving picture apparatus. Fig. 2 is a plan view of the feed sprocket of a moving picture apparatus equipped with an intermittent rotor forming part of the feed apparatus. Fig. 3 is a diagrammatic side view of the apparatus shown in Fig. 1; and Fig. 4 is a view in perspective of the rotor for intermittent feed.

The intermittently rotatable member 10 is preferably of such form as to be balanced with respect to the axis of its shaft 11 and may have generally the form of a cylinder, as shown. It is provided with flat faces, and means are provided for securing its intermittent rotation by coaction with said flat faces. In the form shown there are four of these faces arranged in pairs, and they are produced by cutting notches 12 in the rotary member 10, such notches 12 having their flat bottom faces 13 in planes which are tangential to the axis of rotation of the rotary member 10. In the form shown all the faces 13 are at the same distance from the said axis, and they are arranged in two pairs, the faces in each pair being alike and opposite one another and at the same distance from the axis of rotation, and the one pair of faces being at right angles to the faces of the other pair. Such sets of faces may be arranged in a variety of ways, but in the form shown the member 10 is notched out at its ends so as to leave substantially central lugs 14, 14 extending from its opposite ends in directions at right angles to one another, and the shaft 11, which is preferably formed integral with the member 10, projects axially therefrom and is a continuation of one of the lugs 14.

Means reciprocable in a right line direction are provided for co-acting with the faces 13 and securing intermittent rotation of the member 10 and shaft 11. Such right line reciprocating members are designated by the reference numeral 15 in the form shown, and the faces 16 thereof, which, upon reciprocation of the members 15 contact with and rest upon the faces 13, are located so as to reciprocate with respect to the axis member 10 at substantially the same distance from the axis of its rotation as the distance of the faces 13 from such axis. In the form shown the members 15 are provided with substantially square end faces 17 and are chamfered off or rounded, as shown at 18, where the end face 17 meets the longitudinal or holding face 16. The ends 17 may be of other forms, if desired. The members 15 operate alternately, and as soon as or immediately after one is withdrawn from contact with a face 13 of the member 10, the other reciprocating member 15 comes into operation, and by contact of its end 17 with a face 13 serves to turn the member 10 through an angle, such angle, in the construction shown, being a right angle, and to lock and hold it in such partially rotated position by contact of its face 16 with the face 13 of the member 10. The means for reciprocating the right line reciprocable members 15 may take various forms. In the form shown a gear 19 is rotated by any convenient means, as a crank 20, and a pinion 21 meshes with the gear 19 and is rotated thereby and serves to impart rotation to the shaft 22 which carries eccentrics 23 and 24. The connecting rods 25 and 26 have eccentric straps 27 and 28 in which the eccentrics 23 and 24 turn, and these connecting rods are pivoted to levers or arms 29 and 30 which are pivotally secured to the members 15 and are also pivotally secured at their opposite ends to loose cranks 31 and 32.

In the form shown the eccentrics 23 and 24 are placed at an angle of 180° to one another so that the two members 15, 15, which are guided in any convenient guiding means, as 33, move always in opposite directions and coact alternately in the manner described with the faces 13, 13 of the member 10, each of the reciprocatory members contacting alternately with a face 13 on opposite sides of a lug 14.

It will be seen that with the construction shown the member 10 is alternately rotated through 90°, then held stationary for an interval, and then further rotated in the same direction through another angle of 90°, then it is held stationary, then again advanced through an angle of 90°, and so on, and that the time of rotation is considerably less than the interval during which it is held and locked against rotation.

It will be understood that the construction illustrated is intended only for the purpose of affording a clear understanding of my invention, and that changes and modifications may be resorted to within the scope of my claims, by which my invention is defined.

Having thus described my invention, I claim:

1. A rotary member having a flat face and a right line reciprocating member adapted to produce rotation of said rotary member by terminal contact with said face and to hold said rotary member against rotation by longitudinal contact with said face.

2. A member mounted for rotation and provided with a pair of opposite flat faces at substantially equal distances from its axis of rotation, a member reciprocable in a right line and having a face at substantially the distance of the faces of the rotary member from its axis of rotation, and means for reciprocating said reciprocable member.

3. A member mounted for rotation and having a plurality of pairs of flat faces, the faces of a pair being opposite one another and an equal distance from the axis of rotation, and means for intermittently rotating said member and holding it stationary by coaction with said flat faces.

4. The combination of a rotary member having a plurality of flat faces, a plurality of members reciprocable in a right line, said reciprocable members being adapted to cause rotation of said rotary member by contact of their ends therewith and to hold said rotary member against rotation by longitudinal contact therewith and operating alternately to rotate said rotary member through a portion of a revolution and to hold it stationary.

5. An intermittently rotatable member having two axially projecting lugs at right angles to one another and providing two opposite faces equidistant from the axis of said member, a right line reciprocating member opposite each lug and having a face at the same distance from the axis of the rotatable member as the faces on said lug, and means for reciprocating said reciprocable members alternately to coact with said rotatable member and produce intermittent rotation thereof.

6. A shaft, means for rotating the shaft, a pair of oppositely disposed eccentrics on said shaft, connecting rods operatively connected with said eccentrics, levers pivoted between their ends to said connecting rods, loose cranks pivoted to the levers at an end thereof, guides, members reciprocable in a right line in said guides and pivoted to said levers at the ends opposite the cranks, and a member mounted for rotation and having flat faces engaged by said reciprocatory members whereby intermittent rotation is imparted to said rotary member.

In testimony that I claim the foregoing, I hereto set my hand, this 17th day of August, 1917.

LOUIS ZIEGLER.

Copies of this patent may be obtained for five cents each, by addressing the "Commissioner of Patents, Washington, D. C."